US006998980B2

(12) United States Patent
Ingley, III et al.

(10) Patent No.: US 6,998,980 B2
(45) Date of Patent: Feb. 14, 2006

(54) MICROFIELD INTERFACE DEVICE FOR MONITORING ANIMAL CAGE ENVIRONMENTS

(75) Inventors: Herbert Arthur Ingley, III, Gainesville, FL (US); David Worthington Hahn, Gainesville, FL (US); August Henry Battles, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 63 days.

(21) Appl. No.: 10/427,312

(22) Filed: May 1, 2003

(65) Prior Publication Data

US 2004/0217858 A1    Nov. 4, 2004

(51) Int. Cl.
G08B 1/08    (2006.01)
(52) U.S. Cl. .............................. 340/539.26; 340/573.1; 119/421; 119/452
(58) Field of Classification Search ............. 340/573.1, 340/539.26, 632, 628, 602, 588, 589; 119/421, 119/436, 452
See application file for complete search history.

(56) References Cited

U.S. PATENT DOCUMENTS

| 4,700,887 | A | * | 10/1987 | Timmons | .................... 236/49.3 |
| 5,125,571 | A | * | 6/1992 | Heber | ........................ 236/49.3 |
| 5,746,271 | A | * | 5/1998 | DeCosta | ...................... 165/53 |
| 5,924,924 | A | * | 7/1999 | Richardson | ................. 454/256 |
| 6,234,111 | B1 | | 5/2001 | Ulman et al. | |
| 6,367,418 | B1 | | 4/2002 | Ulman et al. | |
| 6,402,692 | B1 | | 6/2002 | Morford | |
| 6,436,038 | B1 | | 8/2002 | Engstrom | |
| 6,463,397 | B1 | * | 10/2002 | Cohen et al. | ............... 702/140 |
| 6,810,833 | B2 | * | 11/2004 | Bonner et al. | ............... 119/455 |
| 2002/0103443 | A1 | | 8/2002 | Roy et al. | |
| 2003/0024482 | A1 | | 2/2003 | Gondhalekar et al. | |
| 2003/0033115 | A1 | | 2/2003 | Ulman et al. | |

FOREIGN PATENT DOCUMENTS

| EP | 1 080 638 A1 | 3/2001 |
| JP | 200415356 A * | 1/2004 |

OTHER PUBLICATIONS

Kim E. boulukos and Philippe Pognonec, MICE, a program to track and monitor animals in animal facilities, BMC Genetics, 2:4, Mar. 8, 2001.
Feeding/Drinking Monitoring Equipment (visited Sep. 30, 2002) <http://www.colinst.com/17-bxpx.htm>.
Animal Activity Monitor-Operation/Specification (visited Sep. 30, 2002) <http://eecindia.tripod.com/activityTSMOP.htm>.
VersaMax Animal Activity Monitoring System (visited Sep. 30, 2002) <http://www.accuscan-usa.com/versamax.htm>.
Arenas-Response Sensors-Analog Activity Monitor (visited Sep. 30, 2002) <http;//www.coulbourn.com/Animal%20Behavior/Habitest/Analog%20Activity%20Monitor.html>.

(Continued)

*Primary Examiner*—Toan N. Pham
(74) *Attorney, Agent, or Firm*—Akerman Senterfitt (57) ABSTRACT

An automatic animal cage monitoring system includes at least one sensor disposed proximate to a cage for detecting conditions within the cage. The sensor data is transmitted by a wireless transmitter system to at least one remotely located device. The system can simultaneously monitor a plurality of cages. A method for remotely monitoring the conditions associated with an animal within a cage includes the step of obtaining sensor data based on at least one condition within the cage and wirelessly transmitting the sensor data to at least one remote location.

19 Claims, 5 Drawing Sheets

OTHER PUBLICATIONS

MicroMax-Home Cage Monitoring (visited Sep. 30, 2002) <http://www.accuscan-usa/micromax.htm>.

MM-100 Metabolic Monitor System, Accurate oxygen consumption measurement for small animals (visited Sep. 30, 2002) <http://www.cwe-inc.com/images/MM-100.pdf>.

Feeding & Drinking Analyzer Cages (visited Jul. 4, 2003) <http://www.stoeltingco.com/physio/store/viewlevel3.asp?keyword1=15&keyword3=387>.

* cited by examiner

MICROFIELD INTERFACE DEVICE FOR MONITORING ANIMAL CAGE ENVIRONMENTS

FIELD OF THE INVENTION

The present invention relates to devices for monitoring animals in confined environments.

BACKGROUND

Animals are often placed in cages in a variety of situations, such as during a visit to a veterinarian office or in a laboratory conducting research involving animals. In situations in which animals are placed in cages, appropriate care of the animal can include monitoring a variety of animal activities and environmental factors that can affect or indicate the health of the animal. Some of the environmental factors that have been monitored in the past include the amount of liquid and food that the animal consumes. However, there are a wide variety of other environmental factors that can affect the health of an animal.

While environmental factors and animal activities have been conventionally monitored via manual observation, this approach requires repetitive observations by a person. Individuals who monitor environmental factors and animal activities may need training to be able to make accurate observations and measurements. Thus, this conventional approach is both time consuming and costly. Moreover, this approach cannot provide continuous monitoring.

Furthermore, some animals, and in particular some laboratory specimens having specific characteristics, such as pathogen free mice, can be quite valuable. Conventional manual monitoring systems can at best detect a problem some significant time after its onset. Delayed detection of problems can jeopardize the well being of the animal. Therefore, a system for continuously and automatically monitoring a wide variety of environmental factors related to an organism in a confined environment can provide time-saving and cost-saving benefits.

SUMMARY OF THE INVENTION

The present invention relates to an animal cage monitoring system. The system includes at least one sensor disposed proximate to a cage for detecting conditions within the cage and providing sensor data and a wireless transmitter system communicably connected to the sensor for wirelessly transmitting the sensor data to at least one remotely located device. The wireless transmitter system can be a wireless transceiver adapted for also receiving data from a remotely located wireless communications source.

The monitored conditions can include carbon dioxide concentration, ammonia concentration, rate of air flow into the cage, rate of air flow emanating from the cage, temperature within the cage, and humidity within the cage. The system can also include at least one element for identifying specific cages or specific animals. The identification element can generate an audible signal or a light signal.

The system can also include structure communicably coupled to the sensor for delivering material for consumption by the animal based on the detected conditions. The system can also include a data repository coupled to the sensor for storing records of the detected conditions. An alarm member can also be included.

The remotely located device can include a handheld computing device or a central computing device. A ventilation device can be included for providing air flow. Additionally, the system can include at least one communication port and a mounting structure for securing the system to the cage. Structural housing can be provided for environmental shielding. Additionally, an imaging system for obtaining images within the cage can be provided.

A method for remotely monitoring the conditions associated with an animal within a cage can include the steps of obtaining sensor data based on at least one condition within the cage and wirelessly transmitting the sensor data to at least one remote location. The method can also include the step of initiating caring for the animal based on the sensor data. Cage bedding can be changed based on sensor data.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

Figure 1:
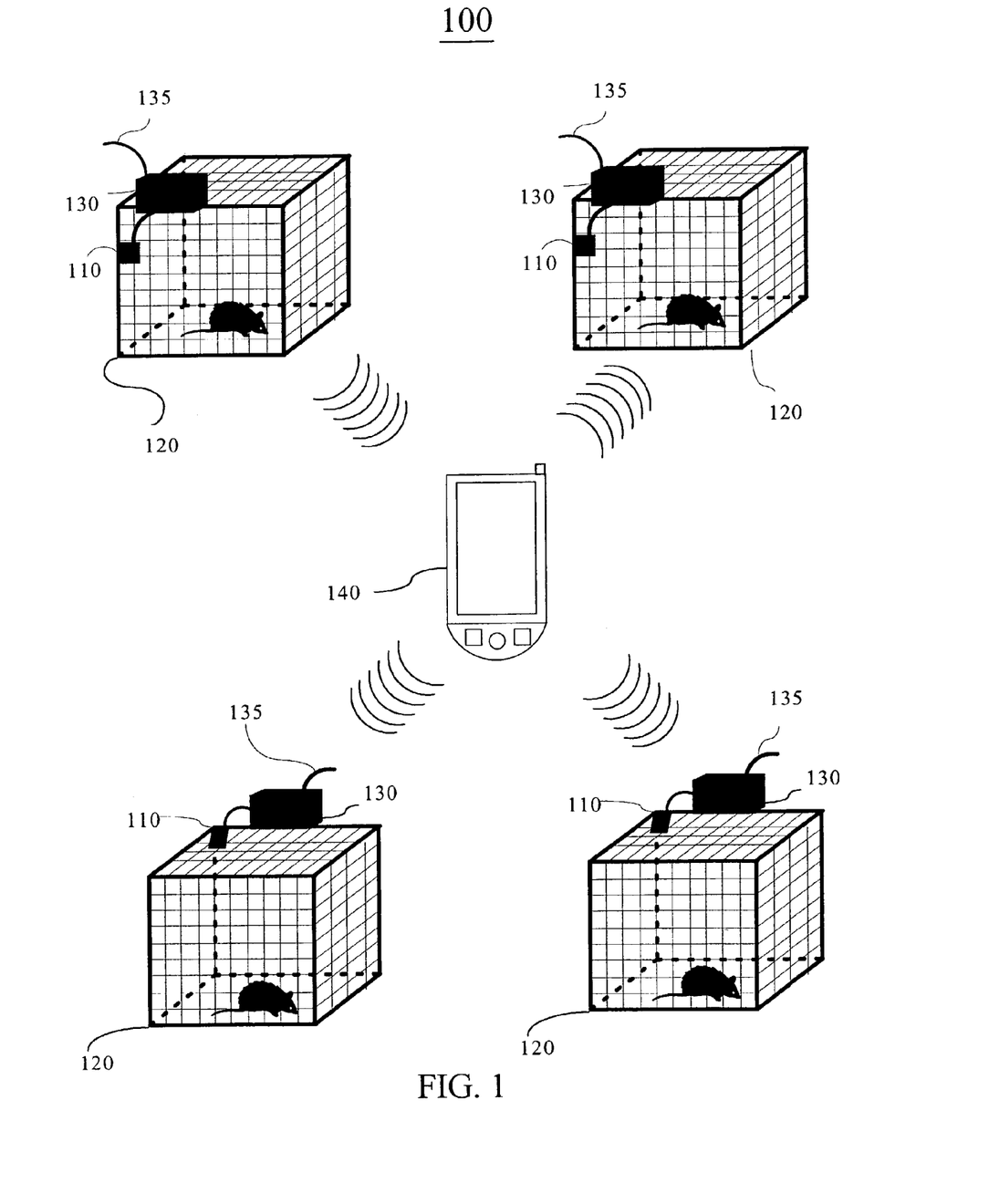
FIG. 1 illustrates a wireless cage monitoring system and method of use in accordance with one inventive arrangement.

Referring to FIG. 1, a system 100 and related method for automatically monitoring a cage is disclosed. The system 100 provides the convenience of obtaining and monitoring conditions within the cage without the need for costly human observation and the associated task of manually taking measurements. The system and method can be used to monitor a variety of animals within a cage, including laboratory animals (e.g., mice), pets, and others. The system 100 provides one or more sensors 110 proximate to the cage 120 to automatically and continuously detect conditions within the cage 120 and provide sensor data. As used herein, the phrase "proximate to the cage" includes locations within the cage or within a distance, such as less than 10 cm, to enable detection of conditions within the cage 120. The system also includes a wireless transmitter system 130 including antenna 135 for wirelessly transferring the sensor data to at least one remotely located device 140, such as a personal digital assistant, a server, a personal computer, and the like.

Figure 2:
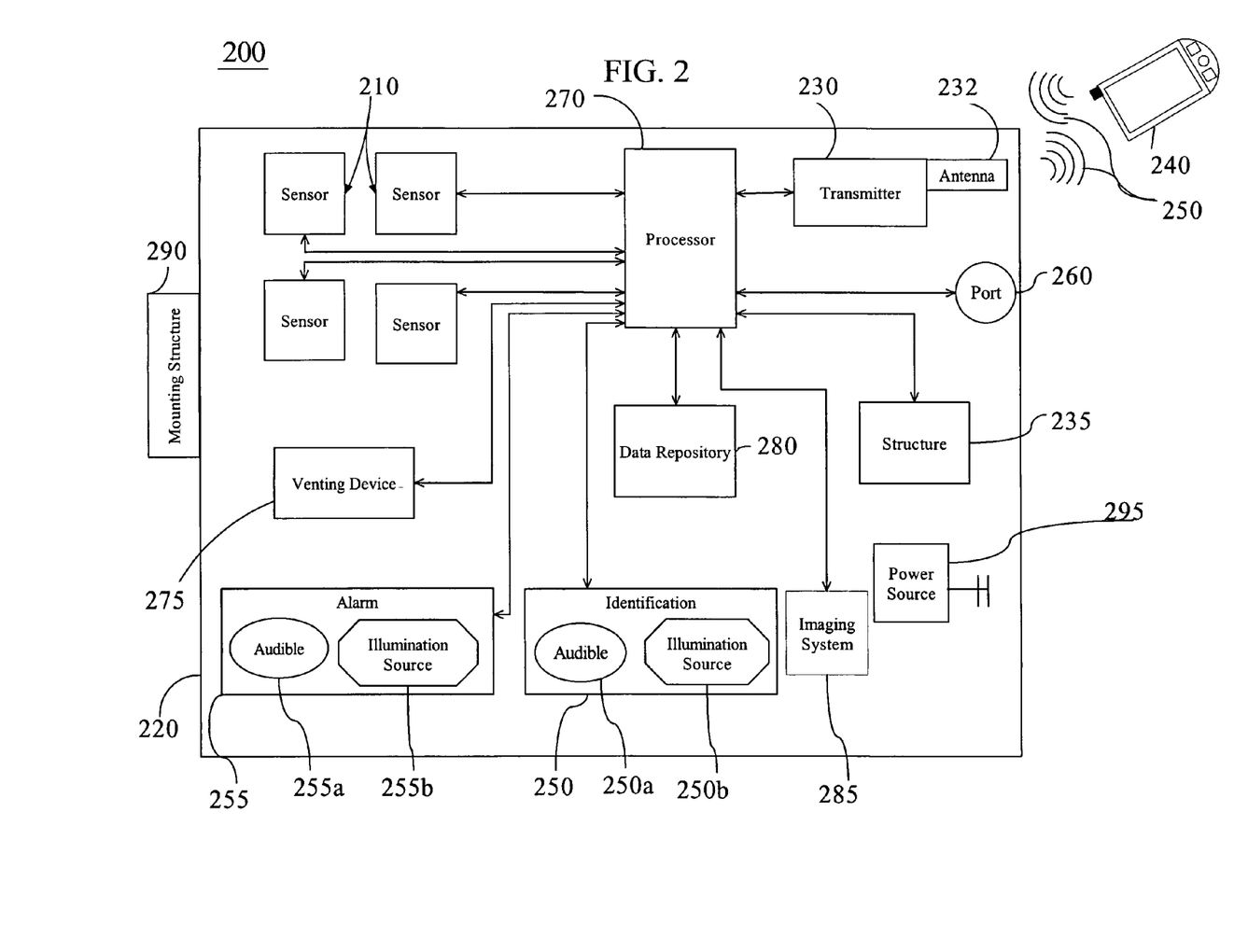
FIG. 2 illustrates a cage monitoring system in accordance with an inventive arrangement.

Referring to FIG. 2, system 200 includes one more sensors 210 for placement proximate to a cage. Additionally, system 200 can include one or more portions for receiving at additional sensors. The receiving portions can be pre-wired to communicably couple additional sensors to system 200. Therefore, system 200 can be referred to as a modular system and can be customized to include additional sensors as selected by a user.

System 200 also includes a wireless transmitter system 230 communicably connected to the sensors 210, such as through conventional hardwiring. The wireless transmitter system 230 including antenna 232 can wirelessly transmit signals containing sensor data to at least one remotely located device 240 via a wireless communications link 250, such as a RF communications link. The wireless communications link 250 can use any suitable link, such as Bluetooth, the 802.11 RF series, infrared, and others. Optical links can also be used, such as infrared links. Additionally, system 200 can include a communications port 260 for wired communications including RS-232, Universal serial bus (USB), FireWire, Ethernet, and the like, for providing a direct connection to a computing device or for providing access to a network, such as for a network of multiple cages and the Internet. For example, hard line configurations may be useful in some installations, especially new construction, where physical lines can be installed to transmit data from the cage racks to a central control in much the same way new homes are constructed with distributed electronic cables and ports.

The wireless transmitter system 230 is preferably a wireless transceiver system which includes a receiver. A wireless transceiver system 230 can both transmit signals containing sensor data and receive signals, such as signals containing instruction data or request data. A wireless transceiver system 230 can allow a user to request specific sensor data, including sensor data from a specific cage using a remotely located device 240. The wireless transceiver system 230 is communicably coupled to the sensors 210 and other elements of system 200.

System 200 can also include structure (not shown) permitting local data use. For example, the data can be stored locally near or on the cage, and can be retrieved periodically through removal of a magnetic tape or by writing to a compact disc. Thus, some users can collect data and store locally, while others can send data to at least one remote location 240.

The system 200 can include a plurality of other elements, such as processors 270. These elements can be communicably connected to a combination of the other elements via conventional hardwiring or via a wireless communications link. For example, processors 270 programmed with suitable software, firmware, and logic circuitry, and can also include one or more data repositories 280 for storing data. Processor 270 can be programmed to instruct wireless transmitter system 230 to transmit sensor data at periodic predetermined intervals or upon the detection of particular conditions. Additionally, if a wireless transceiver system 230 is provided, the wireless transceiver system 230 can transmit sensor data upon receiving a request signal from the remotely located device 240. For example, a user can operate a remotely located device 240, such as a personal digital assistant, and request sensor data from system 200. The wireless transceiver system 230 can communicate the received request to the processor 270, which can interpret the request and instruct the transceiver system 230 to transmit a signal containing the sensor data. System 200 can include an industry standard data repository 280 for storing sensor data and can provide a log of all the detections over a period of time.

System 200 also includes mounting structure 290 for securing the system 200 to a cage, a venting device 275 for inducing air flow, such as a fan, and structure 235 for delivering sustenance materials for consumption by the animal based on sensor data, such as sensor data indicating a lack of food. The venting device 275 can force airflow within a cage to flow past the sensors 210 to allow sensors 210 to detect conditions within the cage without placing the sensors 210 at locations within the cage. The venting device 275 can be programmed to provide airflow at predetermined time intervals.

Further, system 200 can include an industry standard imaging system 285 for obtaining images within the cage. The images can include still images and video which can be wirelessly transmitted to the remotely located device 240 for viewing. The system 200 also includes a power source 295, such as a rechargeable battery.

System 200 includes one or more identification elements 250 for identifying the cage, such one or more audible elements 250a, one or more illumination sources 250b, or identification elements which are encoded with the transmission signal (not shown). The identification elements 250 can include identification tags, barcodes, serial number, or other marking suitable for uniquely identifying a cage. Additionally, the identification elements 250 can include audible elements 250a or illumination sources 250b communicably coupled to the processor 270 for processing received requests and activating the audible elements 250a or illumination sources 250b. The audible elements 250a or illumination sources 250b can also include suitable circuitry for responding to a request received directly by a wireless transceiver system 230. In response to a request, the audible elements 250a and the illuminations sources 250b can produce a signal which uniquely identifies the particular cage.

The identification elements can include a sensor embedded subcutaneously in the animal (not shown) for uniquely marking the animal. The unique marking can identify the animal and allow a user to differentiate between multiple animals having monatomic features, such as typical lab mice, that are located within a single cage. Such a sensor can be wirelessly coupled to communicate with a transceiver or directly with a remote computing device.

In operation, an animal caretaker could desire the location of a given cage in a laboratory including a plurality of cages. With a remotely located device 240, such as a personal digital assistant, the caretaker can identify the location of the specific cage. A wireless transceiver system 230 can receive the request and communicate with the identification elements 250 directly, or via a processor 270, to produce an audible and/or light signal. The audible and/or light signal (such as visible light, ultraviolet light, infrared light, and others) produced by the identification elements 250 can allow the caretaker to quickly identify the location of the specific cage.

The identification elements 250 can be encoded within the signal for transmission. For example, transmission signals from a cage can include data that identifies the particular cage from which the transmission signal originated. Such identification can facilitate in the storage and manipulation of data while ultimately improving the monitoring capabilities and cage monitoring capacity of the system 200.

The system 200 can also include one or more alarm members 255 communicable coupled to the sensors 210 that activate upon the detection of a condition outside a predetermined range. As used herein, a predetermined range can include low and high values for particular conditions. Additionally, a predetermined range can also include the existence or absence of a particular condition. Therefore, a condition that is outside a predetermined range can indicate a condition that is too high, too low, present, or absent.

The alarm members 255 can also include one or more audible elements 255a or one or more light sources 255b. The alarm members 255 can include suitable circuitry for responding to sensor data received directly from the sensors 210, or alternatively, can be communicably coupled to processor 270 which can interpret all sensor data and recognize conditions outside a predetermined range. Upon the detection of a condition outside a predetermined range, sensors 210 can directly provide sensor data to alarm members 255, or can provide sensor data to the processor 270. In either a direct response, or a response instructed by the processor 270, the alarm members 255 can signal an alarm.

The alarm members 255 can be communicably coupled to the data repository 280. Records can be stored regarding frequency of alarm conditions. Furthermore, the alarm members 255 can also be directly communicably coupled to the transceiver system 230 (or transmitter system 230), or communicably coupled to the transceiver system 230 (or transmitter system 230) via the processor 270. In conjunction with activation of an alarm signal upon detection of a condition outside a predetermined range, the transmitter system 230 (or transceiver system 230) can provide such sensor data to the remotely located device 240 as further notification of alarm conditions.

System 200 preferably includes a structural housing 220 for providing at least partial environmental shielding for elements of the system 200. Environmental shielding can provide protection from moisture, heat, light, and other environmental characteristics that can interfere with system 200. Structural housing 220 can be formed from suitable materials, such as plastics.

Figure 3:
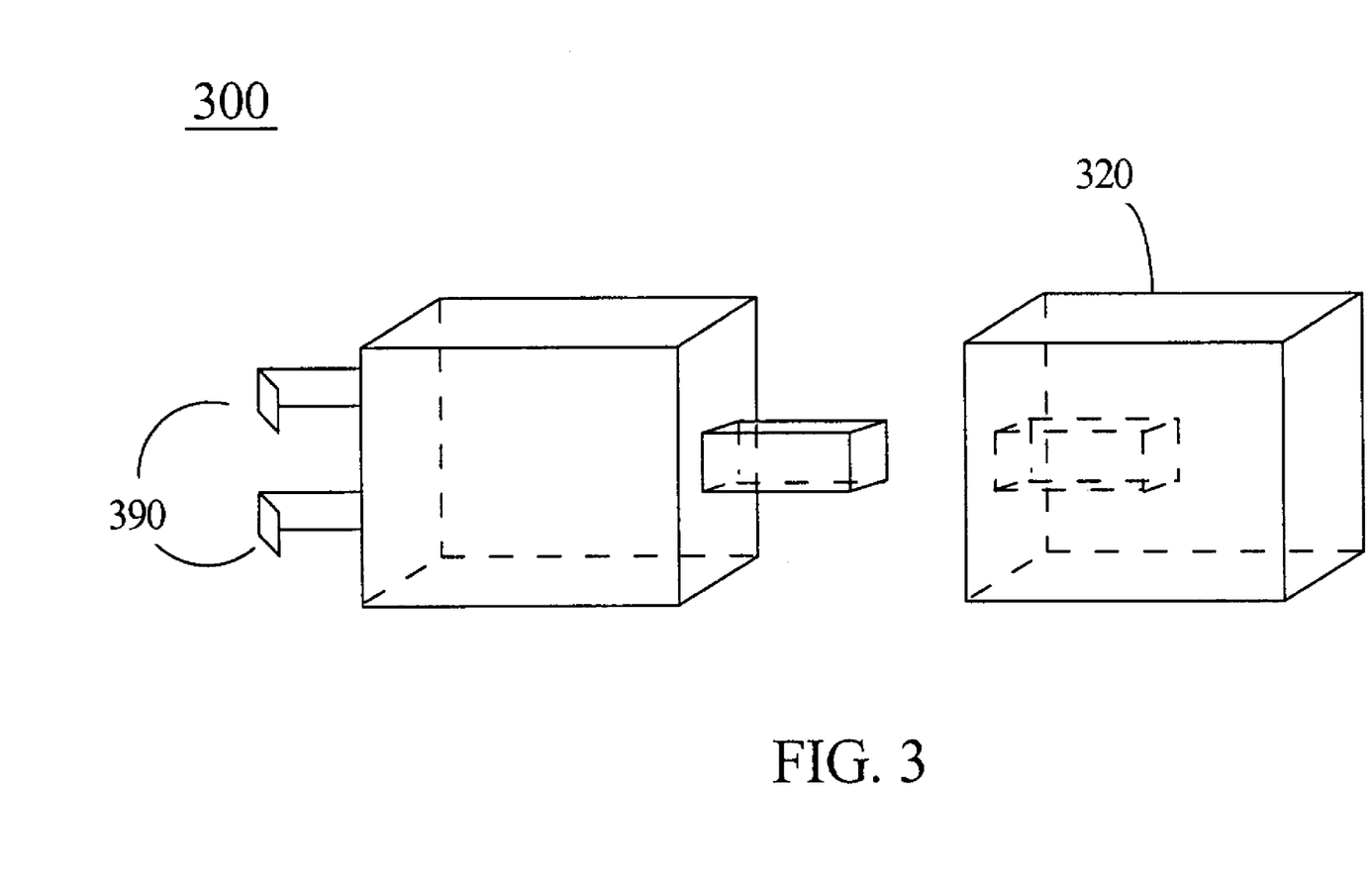
FIG. 3 illustrates a modular structural housing in accordance with another inventive arrangement.

In another embodiment illustrated in FIG. 3, the structural housing 320 can include modular units geometrically arranged to mate with each other. For example, most elements of the system can be included within a first unit, while a second unit can contain the mounting structure 390 designed to mount with a particular cage design. The mounting structure 390 can include hooks, clips, bolts and nuts, velcro, or any suitable structure for securing the system 300 to a cage. Additionally, the mounting structure 390 can be arranged to mate with corresponding geometric structure of a cage to provide a secure attachment. A variety of separate units can correspond to different cage designs. Additionally, while the structural housing 320 can generally be easily cleaned in accordance with rules and regulations which govern the animal caretaking industry, a modular unit with detachable portions can provide the ability to detach sensitive elements for chemical sterilization and leaving other elements to undergo intense sterilization procedures, such as steam autoclaving.

Figure 4:
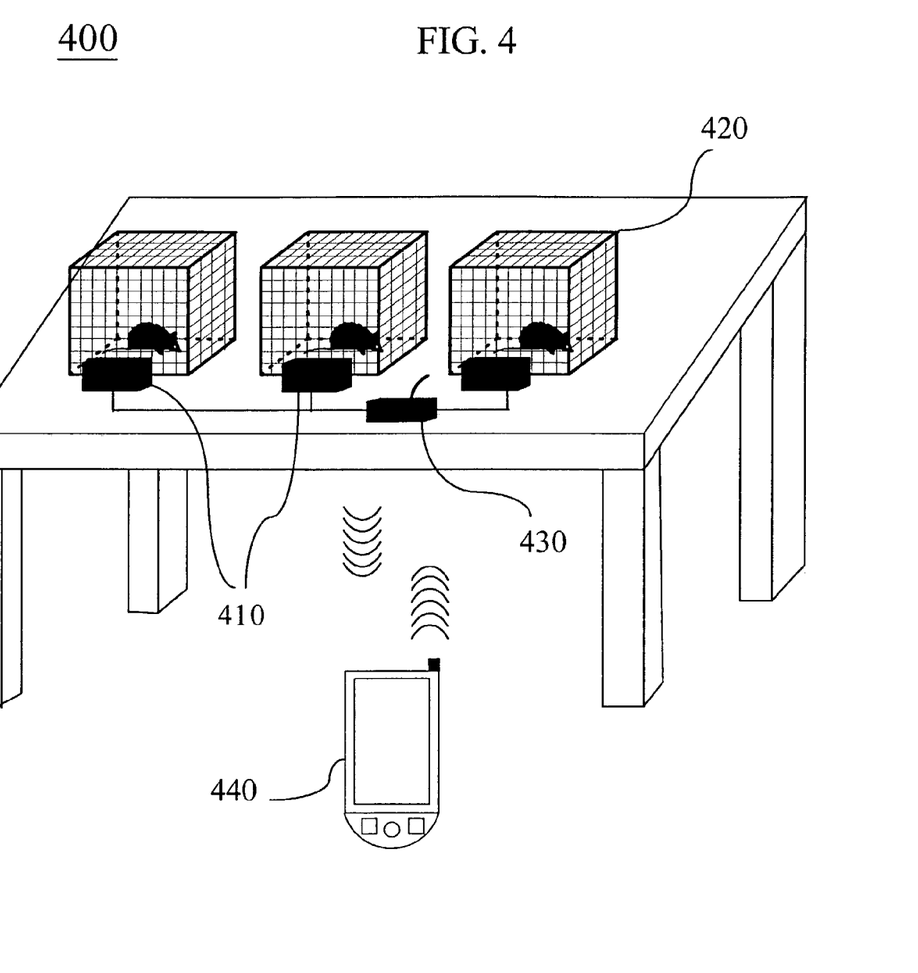
FIG. 4 illustrates one embodiment of a system for monitoring multiple cages in accordance with yet another inventive arrangement.

Although the respective elements of the system have been described as servicing a single cage, the invention is not limited in this regard. Referring to FIG. 4, elements of system 400 can be shared between multiple cages 420. In system 400, sensors 410 for multiple cages 420 are connected to a common transmitter system 430 (or transceiver system 430). Such an embodiment provides the advantages in reducing cost as only one transmitter system 430 (or transceiver system 430) is used for wireless communications between a plurality of cages 420 and a remote device 440. To ensure sufficient allocation of the resources of the transmitter system 430 (or transceiver system 430), the transmitter system 430 simultaneously can communicate cage specific sensor data in real-time from multiple cages 420 using a code-based, time-based, or frequency-based multiplexing, as is known in the wireless industry. Although FIG. 4 illustrates only the transmitter system 430 (or transceiver system 430) shared among multiple cages 420, elements of system 400 can also be similarly shared among multiple cages, such as a processor (not shown) shared among a plurality of networked cages.

In another embodiment (not shown), the venting device can be shared among an array of cages and can be communicably coupled to the sensors, the data repository, the processor, and the wireless transceiver system (or transceiver system). In operation, the sensors can provide sensor data indicating the detection of particular conditions within any of the cages in the array to the processor. In response to the sensor data received, the processor can instruct the venting device to create airflow affecting the array of cages in an attempt to provide fresh air. For example, the sensor data from any cage from the array of cages can indicate a rise in temperature above a predetermined limit, and in response, the processor can instruct the venting device to create an airflow to lower the average temperature within any of the array of cages.

The sensors provided can detect conditions that are indicative of animal activity. Indicators of animal activity comprise conditions that are affected by animal activity or that can affect the general well being of an animal. Such conditions can include carbon dioxide concentration, ammonia concentration, rate of air flow into the cage, rate of air flow emanating from the cage, temperature within cage, humidity within cage, and other related measures. As noted earlier, additional suitable sensors can be added to the system to detect other conditions.

The sensors can be micro-electromechanical systems sensors ("MEMS Sensors"). MEMS sensors include integrated circuits along with mechanical sensors in or on an integrated circuit substrate, such as a silicon substrate. MEMS sensors can combine sensors and a transmitter (or transceiver system) on the same chip as well as signal processing circuitry, such as filters, amplifiers, analog-to-digital converters, and even integrated antennas.

As noted, the system can include a data repository for storing records of the detections where the data repository is communicably coupled to the sensors and to a wireless transmitter system (or transceiver system). The data repository is preferably non-volatile and can include storage devices such as RAM, ROM, Flash Memory, or a hard drive. The data repository can also include removable forms of storage such as magnetic tapes or writeable compact discs. The detection records can be time stamped and stored in the data repository for transmission to a remotely located device at a later time. Such time based storage can produce a log of detection data over time and enhance a user's ability to recognize patterns and trends in monitoring conditions.

Figure 5:
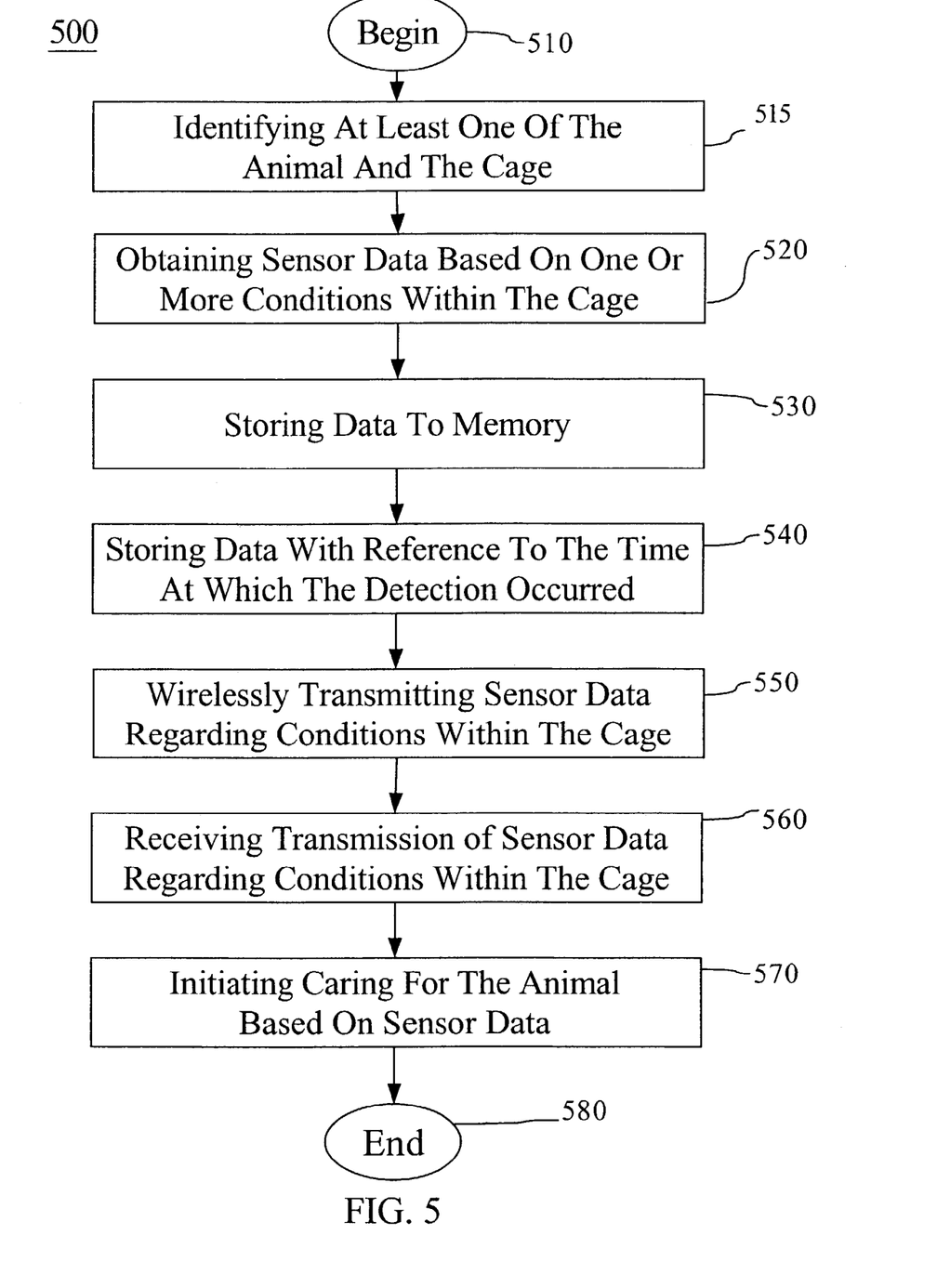
FIG. 5 is a flow chart depicting a method of remotely monitoring conditions within an animal cage.

In accordance with the inventive arrangements, a method for remotely monitoring conditions within a cage is provided. The method 500 can be practiced with the various embodiments of the system discussed above. Nevertheless, the invention is not so limited and can be practiced without references to any particular device, apparatus, or system. The described method 500 can allow an animal caretaker to automatically and continuously monitor an animal cage without the time consuming process of manual checks and observations.

The method can begin at step 510 where an animal, such as a mouse, rat, dog, or cat, is within a cage. At step 515, the cage or the animal can be identified. The cage can be identified by visual inspection, by reading a serial number or barcode, by an identification signal, or any other suitable method. Likewise, the animal can be identified by visual inspection, by receiving an identification signal from an identification sensor embedded on the animal, or any other suitable method.

At step 520, sensor data based on one or more conditions within the cage is obtained. Conditions within the cage can include indicators of animal activity such as any condition that is affected by animal activity or can affect the general well being of an animal. Exemplary conditions within the cage that can be detected can include carbon dioxide concentration, ammonia concentration, rate of air flow into the cage, rate of air flow emanating from the cage, temperature within the cage, humidity within the cage, and other related measures.

In step 530, the detected conditions can be stored to memory, such as in a data repository. The sensor data can be stored for retrieval at a predetermined time or for retrieval upon request. Storing the sensor data provides constant recording of detected conditions without the need for human supervision to observe and record conditions within the cage. Step 540 includes storing data with reference to the time at which the detection occurred. Storing conditions as a function of time can provide a chronological history of the detected conditions, from which analysis can be conducted to determine patterns or trends.

Turning to step 550, the sensor data regarding the conditions within the cage can be wirelessly transmitted to a remote location, such as another room or even to another location within the same room as the cage. Additionally, the sensor data can be transmitted to a remote location using other connections, such as transmitting data over a wired network, such as a LAN, a WAN, or the Internet, where the remote location can be a computing device coupled to the network.

At step 560, the wireless transmission of sensor data is received. The wireless transmission can be received by any device configured to receive the wireless transmission, such as a personal digital assistant, a server, and a personal computer configured to communicate via industry wireless standard communication links. The wireless transmission can be passively received whenever a wireless transmission is broadcast. Nevertheless, receiving a wireless transmission can be in response to a request made for such wireless transmission.

For example, a user can present a computing device and submit a wireless request to receive a wireless transmission of sensor data. In response to such a request, sensor data is wirelessly transmitted in step 550 and wirelessly received in step 560. Furthermore, receiving the sensor data can replace the need for note taking tasks that have been traditionally performed manually by a person.

With the sensor data received in step 560, the sensor data can be reviewed and analyzed. Step 570 can include the step of initiating caring for the animal based on sensor data. Providing care to the animal can include a variety of activities performed for the general well being of the animal, such as changing cage bedding, providing food and water, administering medicine.

For example, sensor data received in step 560 can indicate the detection of a high concentration of ammonia. For a cage with a laboratory rat, such a high concentration of ammonia can indicate the need for a bedding change. An animal care taker can review the sensor data received, and based upon this data, decide to change the cage bedding in step 570. Changing the cage bedding upon detection of a predetermined ammonia concentration threshold is preferred over changing based solely on the passage of a predetermined interval of time as it can prevent premature changing, which adds unnecessary cost, and delayed changing, which can adversely affect the health of the animal.

In another embodiment, sensor data that indicates detection of particular conditions can trigger automatic care, such as releasing more food for consumption, without the need to wirelessly transfer the data. Thus, the initiation of health care can be provided according to the sensor data without a prompt from an animal caretaker. Method 500 can end at step 580, or return to step 510 and be repeated.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

We claim:

1. An animal cage monitoring system, comprising:
   at least one chemical sensor disposed proximate to a cage for detecting a chemical condition within said cage and providing chemical sensor data as a metric of said chemical condition,
   a wireless transmitter system communicably connected to said sensor for wirelessly transmitting said chemical sensor data to at least one remotely located device; and
   wherein said remotely located device analyzes said chemical sensor data and automatically initiates a response based on said metric.

2. The system according to claim 1, wherein said wireless transmitter system comprises a wireless transceiver system, said transceiver system adapted for receiving data from a remotely located wireless communications source.

3. The system according to claim 1, wherein said conditions include at least one of carbon dioxide concentration, ammonia concentration, rate of air flow into said cage, rate of air flow emanating from said cage, temperature within said cage, and humidity within said cage.

4. The system according to claim 1, further comprising at least identification element for identifying said cage or an animal in said cage.

5. The system according to claim 4, wherein said identification element includes an audible element or an illumination source.

6. The system according to claim 1, further comprising structure communicably coupled to said sensor for delivering sustenance materials for consumption of an animal in said cage based on said detected conditions.

7. The system according to claim 1, further comprising at least one data repository coupled to said sensor for storing records of said sensor data.

8. The system according to claim 1, further comprising at least one alarm member, wherein said alarm activates upon the detection of conditions outside a predetermined range.

9. The system according to claim 1, wherein said remotely located device includes a handheld computing device or a central computing device.

10. The system according to claim 1, further comprising at least one communication port.

11. The system according to claim 1, further comprising mounting structure for securing said monitoring system to said cage.

12. The system according to claim 1, further comprising an imaging system for obtaining images within said cage.

13. A method for remotely monitoring conditions associated with an animal within a cage, said method comprising the steps of:

obtaining chemical sensor data as a metric of a chemical condition within said cage;

wirelessly transmitting said sensor data to at least one remote location; and automatically initiating a response based on the metric.

14. The method according to claim 13, wherein the automated response includes initiating caring for the animal is based on said sensor data.

15. The method according to claim 13, further comprising the step of changing cage bedding based on said sensor data.

16. The method according to claim 13, further comprising the step of storing said sensor data.

17. The method according to claim 13, further comprising the step of identifying at least one of the animal and the cage.

18. An animal cage monitoring system, comprising:

at least one chemical sensor disposed proximate to a cage for detecting a chemical condition within said cage and providing chemical sensor data as a metric of said chemical condition, said chemical condition being selected from the group consisting of carbon dioxide concentration, ammonia concentration and a combination thereof;

a wireless transmitter system communicably connected to said sensor for wirelessly transmitting said chemical sensor data to at least one remotely located device; and wherein said remotely located device analyzes said chemical sensor data and automatically initiates a response based on said metric.

19. The system according to claim 18, further comprising at least identification element for identifying said cage or an animal in said cage.

* * * * *